US012769105B2

(12) United States Patent
Münchow et al.

(10) Patent No.: US 12,769,105 B2
(45) Date of Patent: Oct. 20, 2026

(54) MEASURING SYSTEM AND METHOD FOR MEASURING LIGHT SOURCES

(71) Applicant: Instrument Systems GmbH, Munich (DE)

(72) Inventors: Frank Münchow, Munich (DE); Stephanie Grabher, Munich (DE); Martin Finger, Bockhorn (DE)

(73) Assignee: Instrument Systems GmbH, Munich (DE)

( * ) Notice: Subject to any disclaimer, the term of this patent is extended or adjusted under 35 U.S.C. 154(b) by 611 days.

(21) Appl. No.: 18/011,176

(22) PCT Filed: Jun. 16, 2021

(86) PCT No.: PCT/EP2021/066280

§ 371 (c)(1),
(2) Date: Dec. 18, 2022

(87) PCT Pub. No.: WO2021/255113

PCT Pub. Date: Dec. 23, 2021

(65) Prior Publication Data

US 2023/0244070 A1 Aug. 3, 2023

(30) Foreign Application Priority Data

Jun. 18, 2020 (DE) ..................... 10 2020 116 167.0

(51) Int. Cl.
*G01J 1/42* (2006.01)
*G02B 21/18* (2006.01)
(Continued)

(52) U.S. Cl.
CPC ........... *G02B 21/18* (2013.01); *G02B 27/106* (2013.01); *G02B 27/288* (2013.01); *G01J 1/00* (2013.01);
(Continued)

(58) Field of Classification Search
CPC .... G02B 21/18; G02B 27/106; G02B 27/288; G02B 21/0096; G02B 5/201;
(Continued)

(56) References Cited

U.S. PATENT DOCUMENTS

2001/0053265 A1* 12/2001 Yamashita ............ G01J 1/4257 385/48
2002/0190194 A1* 12/2002 Birrer ................... G01J 1/4228 250/214 R (Continued)

OTHER PUBLICATIONS

Dudak, Jan, "High-resolution X-ray imaging applications of hybrid-pixel photon counting detectors Timepix", Jun. 8, 2020, Elsevier, vol. 137 (Year: 2020).*

(Continued)

*Primary Examiner* — Michelle M Iacoletti
*Assistant Examiner* — Judy Dao Tran

(57) ABSTRACT

The present disclosure relates to a measuring system for measuring a light source in a polarization-independent manner, having a camera comprising a plurality of image sensors arranged in the form of a matrix, and a microscope optics, and to a method for measuring the light sources in a polarization-independent manner. The aim is to make it possible to measure the light output of the light source in an improved, simple and largely polarization-independent manner while maintaining the spatial resolution in the microscopic range. To that end, the present disclosure proposes that a linear polarizer is associated with each of the image sensors, wherein the linear polarizers are arranged in the form of a matrix in front of the image sensors and two or more, preferably four, polarizers form a matrix block, wherein the transmission directions of adjacent linear polarizers within a matrix block are rotated relative to one another, preferably by 45° or by 90°. In the method according to the present disclosure, the measurement signals of the
(Continued)

image sensors that are associated with the polarizers of the same matrix block are converted into light output measured values in order to obtain the desired polarization independence.

16 Claims, 5 Drawing Sheets

(51) Int. Cl.

| | |
|---|---|
| ***G02B 27/10*** | (2006.01) |
| ***G02B 27/28*** | (2006.01) |
| *G01J 1/00* | (2006.01) |
| *G01J 3/02* | (2006.01) |
| *G02B 21/00* | (2006.01) |
| *H01S 3/00* | (2006.01) |

(52) U.S. Cl.
CPC ........... *G01J 1/4257* (2013.01); *G01J 3/0218* (2013.01); *G02B 21/0096* (2013.01); *H01S 3/0014* (2013.01)

(58) Field of Classification Search
CPC ....... G02B 3/0056; G02B 27/285; G01J 1/00; G01J 1/4257; G01J 3/0218; G01J 4/02; G01J 2001/4247; G01J 2001/448; G01J 1/0411; G01J 1/0429; G01J 1/0488; H01S 3/0014
See application file for complete search history.

(56) References Cited

U.S. PATENT DOCUMENTS

2004/0036889 A1* 2/2004 Witzel ................. G01M 11/331 356/73.1
2007/0131842 A1* 6/2007 Ernst ......................... G01J 1/04 250/205
2009/0185173 A1* 7/2009 Ashdown ................ G01J 3/504 356/121
2013/0270421 A1* 10/2013 Kanamori .............. G02B 5/201 250/208.1
2016/0231175 A1 8/2016 Sasada et al.
2020/0013819 A1 1/2020 Toda
2020/0041339 A1* 2/2020 Fraedrich ............. G02B 5/1861
2020/0209602 A1* 7/2020 Pau ....................... G01M 11/331
2021/0084206 A1* 3/2021 McEldowney ...... G06V 10/147
2021/0175270 A1* 6/2021 Pang ................... H10F 39/8023

OTHER PUBLICATIONS

Chen et al, "Calibration method of microgrid polarimeters with image interpolation", Feb. 2015, Applied Optics, vol. 54, No. 5 (Year: 2015).*

International Search Report and the Written Opinion Dated Sep. 9, 2021 From the International Searching Authority Re. Application No. PCT/EP2021/066280. (15 Pages).

Prüfungsbericht (Examination Report) Dated Feb. 24, 2021 From the Deutsches Patent—und Markenamt [German Patent and Trademark Office] Re. Application No. 102020116167.0. (4 Pages).

Chen "Going Polarized: Adding A New Perspective to Industrial Imaging", LUCID Vision Labs, XP055617610, 31 P., Nov. 8, 2018.

Rebhan et al. "Principle Investigations on Polarization Image Sensors", Proceedings of the SPIE, Photonics and Education in Measurement Science, XP060124567, 11144: 111440A-1-111440A-3, Sep. 17, 2019.

Sharizal Alias et al. "Comprehensive Uniformity Analysis of GaAs-Based VCSEL Epiwafer by Utilizing the On-Wafer Test Capability", Journal of Russian Laser Research, XP055836047, 30(4): 368-375, Published Online Jul. 2, 2009.

Sony "Sony Semiconductor Solutions: Polarization Image Sensor", Sony, XP055617604,2 P., Oct. 17, 2018.

* cited by examiner

MEASURING SYSTEM AND METHOD FOR MEASURING LIGHT SOURCES

RELATED APPLICATIONS

This application is a National Phase of PCT Patent Application No. PCT/EP2021/066280 having International filing date of Jun. 16, 2021 which claims the benefit of priority of German Patent Application No. 10 2020 116 167.0 filed on Jun. 18, 2020. The contents of the above applications are all incorporated by reference as if fully set forth herein in their entirety.

FIELD AND BACKGROUND OF THE INVENTION

The present disclosure relates to a measuring system for measuring a light source in a polarization-independent manner, having a camera comprising a plurality of image sensors arranged in the form of a matrix, and a microscope optics. The present disclosure relates further to a method which uses such a measuring system.

Such measuring systems are used to measure light sources microscopically with the aid of the camera and—after suitable calibration—to determine the distribution of the absolute output of the light source. The light source can in particular be an arrangement of VCSEL (vertical-cavity surface-emitting laser) elements, for example in the form of a VCSEL matrix on a wafer. The light emitted by the individual VCSEL elements is thereby polarized, wherein the polarization direction is indeterminate or changes over time. The image sensors in known measuring systems, which use CMOS cameras, are polarization-dependent. As a result of the indeterminate polarization of the light to be measured, systematic errors of up to 10% can occur in the measurement of the light output.

In order to eliminate or reduce the polarization of the light, there are different types of depolarizers, which produce unpolarized light from polarized light. However, specifically in the case of VCSEL elements, the depolarizers have the disadvantage that they function only extremely unsatisfactorily because the light source has too narrow a spectrum, as a result of which a residual polarization persists and/or the required spatial resolution in the measurement of the incident light can no longer be maintained owing to birefringent properties.

None of the known measuring systems provide satisfactory compensation for the polarization properties, or they are far too complex. Consequently, absolute power measurement is not possible with an acceptable error budget. With the known measuring systems, it is possible at best to measure the relative output of the VCSEL elements.

SUMMARY OF THE INVENTION

The object is, therefore, to further develop a measuring system of the type mentioned at the beginning to the effect that it is thereby possible to measure the absolute output, or a radiometric quantity linked to the absolute output, such as in particular the radiation density, of the light source in an improved, simple and largely polarization-independent manner while maintaining the spatial resolution in the microscopic range.

To that end, the present disclosure proposes, proceeding from a measuring system of the type mentioned at the beginning, that a linear polarizer is associated with each of the image sensors, wherein the linear polarizers are arranged in the form of a matrix in front of the image sensors and two or more, preferably four, polarizers form a matrix block, wherein the transmission directions of adjacent linear polarizers within a matrix block are rotated relative to one another, preferably by 45° or by 90°.

The present disclosure further proposes a method for measuring a light source in a polarization-independent manner using such a measuring system, in which the light source emits light which is focused on the image sensors of the camera by the microscope optics, the light passes through the polarizers associated with each of the image sensors, and the light is captured by the image sensors, wherein each image sensor converts the light that is incident on the image sensor into a measurement signal, wherein the measurement signals of the image sensors that are associated with the polarizers of the same matrix block are then converted into light output measured values in which polarization-dependent deviations are compensated for, and an image of the distribution of the light output of the light source is produced from the light output measured values of all the matrix blocks.

BRIEF DESCRIPTION OF THE DRAWINGS

The present disclosure will be explained in greater detail hereinbelow with reference to the drawings, in which.

DESCRIPTION OF SPECIFIC EMBODIMENTS OF THE INVENTION

Figure 1A:
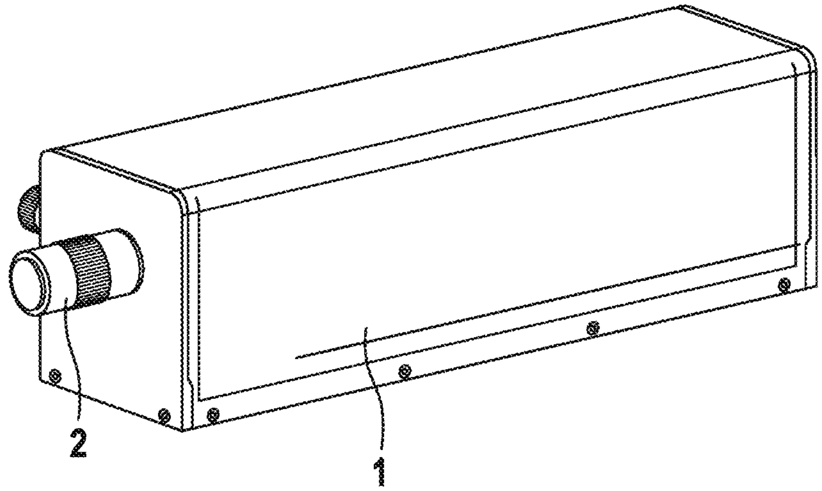
FIGS. 1*a* and 1*b*: show, schematically, a 3D view of a measuring system according to the present disclosure with a housing (a) and without a housing (b)

By using a matrix of polarizers in front of the individual image sensors, the polarization of the light that strikes the respective image sensor is clearly defined. The polarization sensitivity of the image sensors is thus compensated for and the error budget of the measurement is minimized by the averaging of the measurement signals. Averaging over the measurement signals yields a value which is independent of the polarization and which is linked with the absolute output by way of a value obtained by a calibration. The spatial resolution in the measurement of the light output distribution can be defined by the microscope optics in combination with the size of the matrix blocks.

A 2×2 matrix of four polarizers, the transmission directions of which are each rotated by 45° relative to one another, that is to say, for example, have a transmission direction of 0°, 45°, 90° or 135°, is particularly advantageous. The transmission direction indicates the direction, perpendicular to the beam path direction, of the electric field of the electromagnetic light wave which is able to pass through the respective polarizer.

A rotation of the transmission directions of the adjacent polarizers of 90° is sufficient to neutralize the polarization effect. Rotation by 45° makes it possible to measure the polarization.

An advantageous further development of the present disclosure provides that micro lenses are arranged in the form of a matrix in front of the polarization filters. By means of the micro lenses, the incident light on the light-sensitive surface of each image sensor is optimally distributed and thus the sensitivity of the image sensors is increased and noise is reduced.

In order to further improve the measurement, it is expedient if a beam splitter is used and the light of the light source can be fed by means of the beam splitter to the camera and at the same time to a spectral measuring device. By using a spectral measuring device, the measurement can be rendered more precise in respect of the light intensity/output and the spectrum. The spectral measuring device can additionally be used for calibrating the camera.

A spectroradiometer, for example, can be used as the spectral measuring device. Spectroradiometers have proved themselves in practice owing to a precise and reliable way of measuring. The spectroradiometer can be designed to perform a so-called spot measurement, that is to say, unlike a camera, it does not measure in a spatially resolving manner. For example, individual VCSEL elements of the light source can be addressed by a diaphragm, which is displaceable transverse to the beam path, and measured precisely by means of the spectroradiometer.

As an alternative to the spectroradiometer, the spectral measuring device can comprise an optical edge filter which can be pivoted or moved into the beam path between the light source and the camera. One image is thereby recorded by means of the camera without the optical edge filter pivoted in, and a further image is recorded with the optical edge filter pivoted in. The absorption edge of the edge filter is thereby in the range of the average emission wavelength (which is known beforehand) of the light source, so that an individual absorption value of the edge filter can be assigned to each wavelength. By comparing the measurement signals of the two measurements, the wavelength for each individual image point can then be determined very easily on the basis of the known filter characteristics. This is best carried out by means of software. In the case of a VCSEL matrix as the light source, each individual VCSEL element, for example, can be identified on the basis of its position in the image, in order to be able to assign an individual emission wavelength to each VCSEL element. This measurement principle also functions in principle independently of the polarizers associated with the image sensors, that is to say with any measuring system that comprises a camera comprising a plurality of image sensors arranged in the form of a matrix and in which there is provided an optical edge filter which can be pivoted or moved into the beam path between the light source and the camera.

A preferred embodiment of the present disclosure provides that the microscope optics comprises at least one optical filter, for example a neutral-density filter, in order to adapt the intensity of the light emission to the sensitivity of the camera.

It is further expedient if the microscope optics comprises a tube lens. This makes it possible to implement the microscope with a so-called "infinity optics", so that there is flexibility in the insertion of intermediate elements (filter, beam splitter, etc.) into the beam path.

One possible disadvantage of the approach according to the present disclosure is that an interpolation between the image sensors may be necessary in order to obtain the full resolution of the arrangement in the form of a matrix. This is not a fundamental disadvantage, a corresponding interpolation is common in conventional RGB camera sensors. In a preferred embodiment, the magnification and the numerical aperture of the microscope optics are so chosen that the optical resolution is lower than the geometric "digital" resolution resulting from the arrangement and size of the matrix blocks. It can thereby be ensured that the Nyquist criteria are met, so that no information is lost.

Figure 1B:
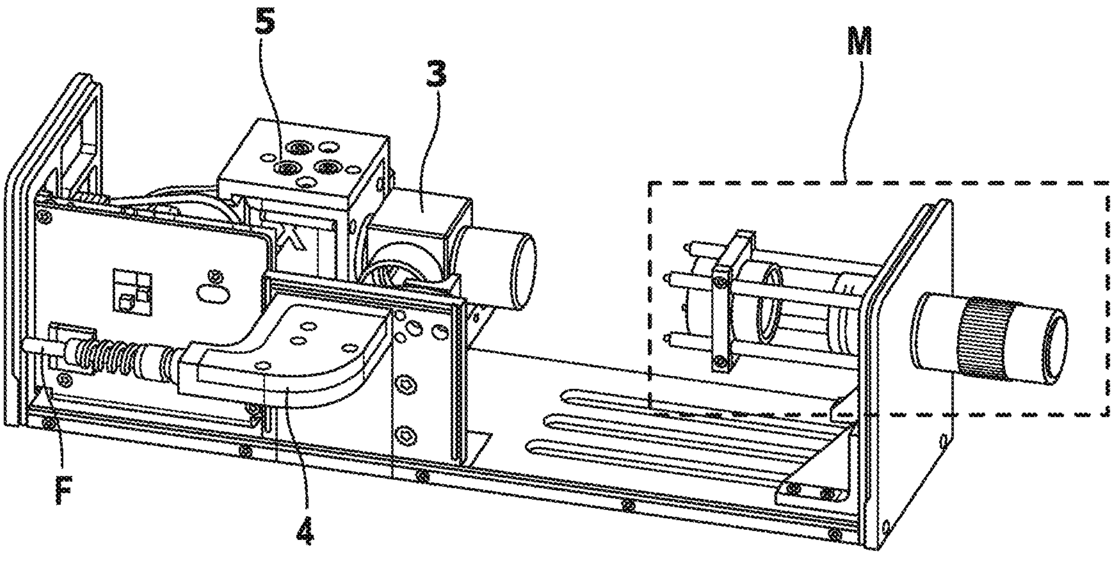

In the figures, the housing of the measuring system according to the present disclosure is designated with reference sign 1. A microscope objective 2 is arranged on the front side. FIG. 1*b* shows the interior of the measuring system with the housing 1 removed. Behind the microscope objective 2, further elements of a microscope optics M are arranged, the individual components of which will be discussed in detail hereinbelow (see FIG. 2). A beam splitter 3 is further provided, which guides part of the light by way of a coupling optics 4 into a light-transmitting fiber F, of which only a short piece is shown. The fiber guides the light to a spectroradiometer (not shown), in order to perform a spectral measurement. A camera 5 is further provided, which captures the other part of the light for the spatially resolved measurement of the light output.

Figure 2:
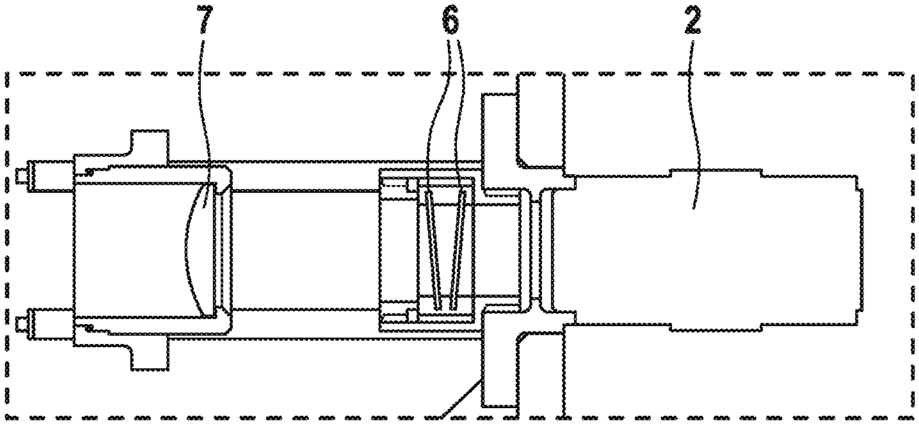
FIG. 2: shows, schematically, detail region A from FIG. 1*b;*

FIG. 2 shows the microscope optics M from FIG. 1*b* in detail. Optical filters 6 and a tube lens 7 are arranged behind the microscope objective 2.

Figure 3A:
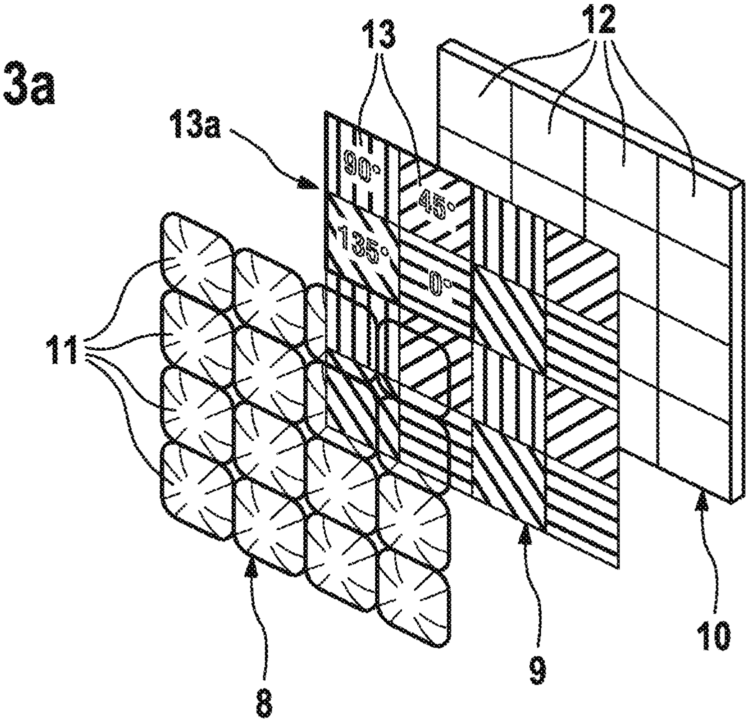
FIGS. 3*a* and 3*b*: show, schematically, the construction of the polarizers for use in a measuring system according to the present disclosure.

In FIG. 3*a*, three matrix arrangements (8, 9, 10) are shown, which are components of the camera 5. The matrix arrangement 8 at the front is composed of micro lenses 11. The rear matrix arrangement 10 is formed of individual image sensors 12. The image sensors 12 are in the form of, for example, CMOS sensors or CCD sensors. Between these two matrix arrangements 8, 10 there is a further matrix arrangement 9. The matrix arrangement 8 is composed of polarizers 13. The transmission angles of adjacent polarizers 13 are different. An image sensor 12 and a micro lens 11 are associated with each polarizer 13.

Figure 3B:
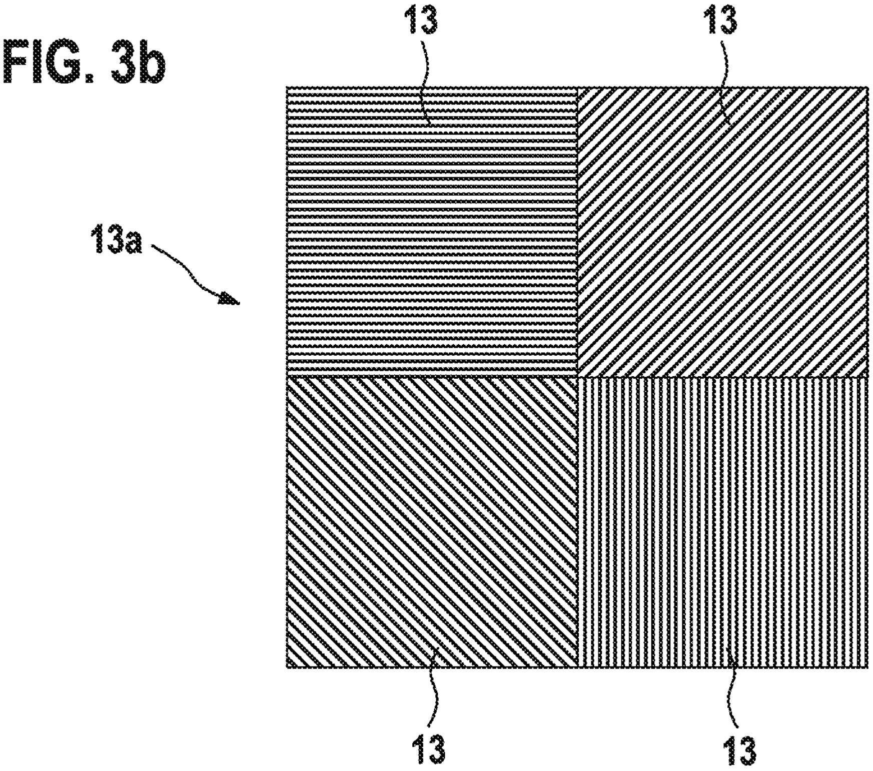

The polarizers 13 are additionally divided into 2×2 matrix blocks 13*a*. Such a matrix block 13*a* is shown schematically in FIG. 3*b*. The transmission directions of the individual polarizers 13 of a matrix block 13*a* are here each rotated by 45° relative to the adjacent polarizers 13 and in this exemplary embodiment lie at 0°, 45°, 90° and 135°.

In the measurement of a light source using the measuring system according to the present disclosure, light is emitted by the light source. The light is introduced into the measuring system by way of the microscope objective 2 and guided through the optical filters 6 and the tube lens 7 to the beam splitter 3. By way of the beam splitter 3, the light is guided to the camera 5 and in parallel to the spectroradiometer. In the camera, the light strikes the image sensors 12 by way of the micro lenses 11 and through the polarizers 13. The light is captured by means of the image sensors 12 and converted into electrical measurement signals. The measurement signals of the image sensors 12 that are associated with a 2×2 matrix block 13*a* are then each converted into an output measured value which is free of polarization effects. The influence of the polarization of the light emitted by the light source is thereby minimized and the measurement result is virtually polarization-independent. The polarization sensitivity of the image sensors 13 is compensated for by the conversion, and the error budget caused by the polarization is minimized. Thus, the light output can be determined precisely and in a spatially-resolved manner. For determining the absolute output or a radiometric quantity linked with the absolute output, such as in particular the radiation density, calibration, for example by measuring a reference light source beforehand, is necessary. The opening angle of the light emission can be determined by varying the distance between the light source and the measuring system and observing the change in the image scale on the sensor array 10. This is of interest in particular when measuring VCSEL arrays. At the same time, the measuring system makes it possible to measure the absolute output of individual emitters of a VCSEL array quickly, easily and precisely.

It is conceivable in other embodiments according to the present disclosure to divide the polarizers 12 into 2×1 matrix blocks, for example, and to shift the transmission directions of the polarizers 13 of a matrix block by 90°. Further variants are possible.

For converting the measurement signals into output measured values, a polarization-dependent correction factor can be used according to the present disclosure. The 2D information of the polarization contained in each matrix block is used to find the correct correction factor for each pixel.

A typical calibration for a camera consists of a bad-pixel correction, a dark-current correction ("img_dark(x,y)"), a flat-field calibration ("img_ffc(x,y)") and a sensitivity correction ("sensitivity(lambda)"):

$$\text{img\_cal}(x,y)=(\text{img\_raw}(x,y)-\text{img\_dark}(x,y))*\text{img\_ffc}(x,y)*\text{sensitivity}(\text{lambda})$$

- "img_raw" is the image as seen by the camera, with the raw camera pixels.
- "img_dark" is the dark noise of the camera, typically measured with the camera in dark surroundings without light.
- "img_ffc" is a position-dependent correction factor due to imperfections of the optics and the sensitivity changes of the camera.
- "sensitivity(lambda)" is a wavelength-dependent correction factor due to the camera technology, the quantum efficiency of which is dependent on the wavelength of the incident light.

According to the present disclosure, this conventional correction is extended by a correction factor for the polarization:

$$\text{img\_cal}(x,y)=(\text{img\_raw}(x,y)-\text{img\_dark}(x,y))*\text{img\_ffc}(x,y)*\text{sensitivity}(\text{lambda})*\text{polcorrection}(x,y)$$

The polarization correction ("polcorrection(x,y)") is dependent on the polarization angle at a position (x,y) and the degree thereof at that position (x,y):

$$\text{polcorrection}(x,y)=A0(x,y)*\cos(2*\text{alpha}(x,y)-\text{alpha0}(x,y))+A\text{off}(x,y)\text{DoP}(x,y)$$

- "alpha(x,y)" describes the polarization angle at position (x,y), measured by the camera and its polarization-sensitive pixels (matrix blocks),
- "DoP(x,y)" describes the degree of polarization at position (x,y), measured by the camera and its polarization-sensitive pixels,
- "A0(x,y)" describes a position-sensitive matrix of the zero-phase polarization,
- "alpha0(x,y)" describes the zero-phase polarization (dependent on the polarization filters of the respective matrix block at position x,y of the sensor matrix),
- "AOff(x,y)" describes a position-dependent offset of the amplitude.

Calibration for a camera with four different polarization orientations is carried out in a further development of the method according to the present disclosure in the following steps:

1. Bad-pixel correction: So-called cold and hot pixels in the camera are determined in the same manner as in conventional methods. At least two images are recorded in dark mode and in the light state and the individual pixel deviations are determined.
2. Dark-current correction: An image is recorded in dark surroundings (as in conventional methods). This gives the value for the dark-current correction "img_dark(x, y)".
3. Flat-field calibration: Different flat-field calibration images are recorded with polarized light with at least four different polarizations (e.g. 0°, 45°, 90°, 135°). For each polarization, the flat-field calibration is carried out in the same manner as in conventional methods. The four flat-field calibration images are used to correct each polarization filter of the camera. A complete image is calculated therefrom. This gives the value for the flat-field calibration "img_ffc(x,y)", independent of the polarization.
4. Any offset owing to non-ideal polarizers (manufacturing inaccuracies, etc.) can be calculated from the four different polarization images. This gives an offset for each polarization calculation (alpha0(x,y)) and an amplitude variation, dependent on the position on the camera (A0(x,y)) and possibly dependent on the polarization of the light (Aoff(x,y)), which is also dependent on the degree of polarization.
5. Monochromatic light is used to measure the sensitivity of the camera. This must be carried out over the entire wavelength calibration range and gives a scalar factor for each wavelength. This is required for the absolute calibration of the camera. This gives the value for the sensitivity correction "sensitivity(lambda)".

Figure 4A:
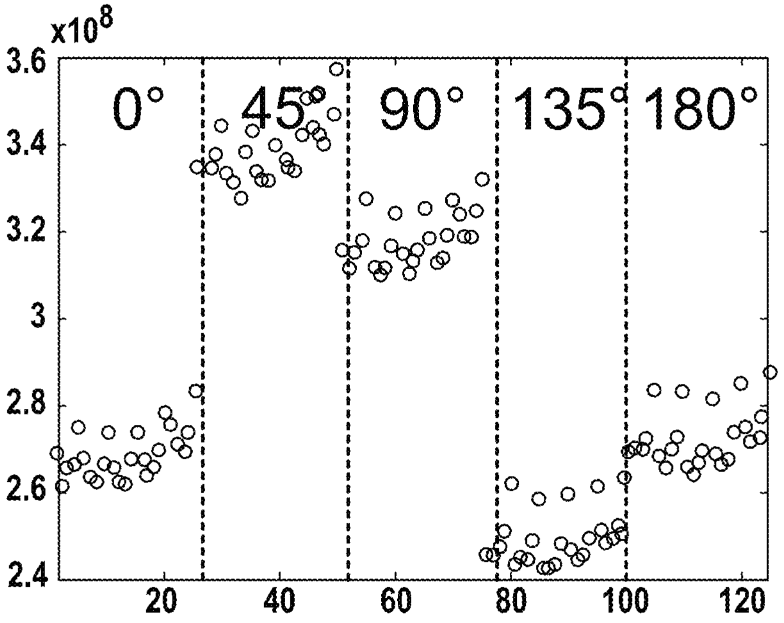
FIGS. 4*a* and 4*b*: show the total output measurement with different polarizers without polarization correction (4*a*) and with polarization correction (4*b*)
Figure 4B:
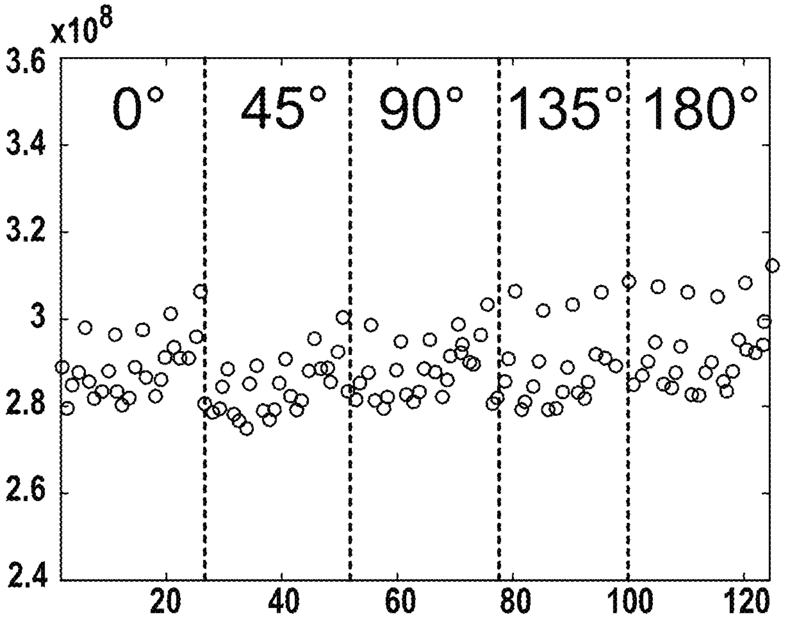

In FIGS. 4*a* and 4*b*, total output measurements without and with polarization correction are compared with one another. The measurement was carried out with rotation of the light source in 45° steps. The measurement was performed using a polarized light source and a typical CMOS camera with a microscope optics. In FIG. 4*a*, a difference in the pixel sum of more than 10% is apparent only as a result of rotation of the polarization of the light source by 90°. This clearly shows that the polarization of the light source cannot be disregarded when the absolute output is to be measured using a camera. The polarization dependence cannot be disregarded in the case of relative measurements of individual emitters of a VCSEL array either, because there is the possibility of the polarization change for each emitter individually.

FIG. 4*b* shows the result of measuring the same light source using a camera with polarization filters and carrying out a polarization correction as described above. Virtually no polarization dependence can be seen.

Figure 5:
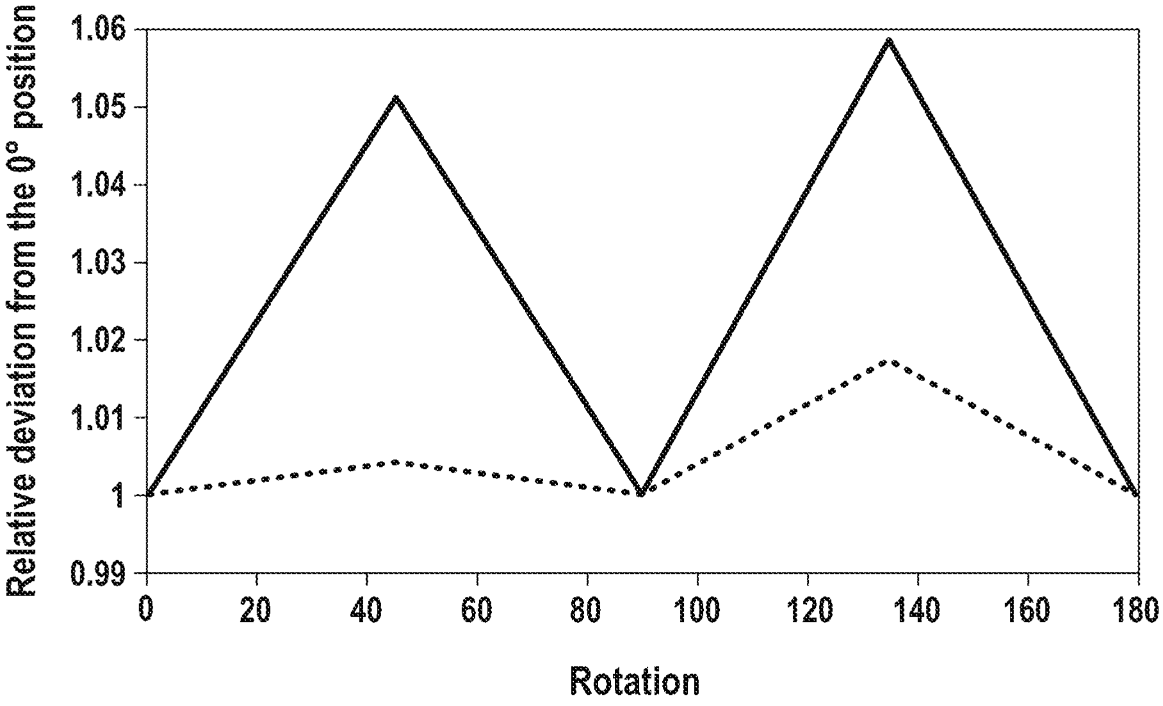
FIG. 5: shows the total output measurement with a conventional camera and according to the present disclosure with a camera having polarizers including polarization correction.

FIG. 5 shows a measurement of a polarized light source. The total power measured with a standard CMOS camera (solid line) and measured with the camera with polarizers (broken line) and correction according to the present disclosure is shown.

LIST OF REFERENCE SIGNS

1 housing
2 microscope objective
3 beam splitter
4 coupling optics
5 camera
6 optical filters
7 tube lens

8-10 matrix arrangements
11 micro lens
12 image sensor
13 polarizer
13*a* matrix block of polarizers 13
M microscope optics
F fiber

What is claimed is:

1. A measuring system for measuring a light source in a polarization-independent manner, comprising:

a camera having a plurality of image sensors arranged in the form of a matrix, a microscope optics, and a plurality of linear polarizers arranged in the form of a matrix in front of the plurality of image sensors and associated with the plurality of image sensors, wherein the two or more of the plurality of linear polarizers form a matrix block, wherein the transmission directions of adjacent linear polarizers within a matrix block are rotated relative to one another by 45° or by 90°, wherein the plurality of linear polarizers of the same matrix block simultaneously filter light incident on their respectively associated image sensors at their different fixed transmission directions, and wherein the measuring system is configured such that the measurement signals of the plurality of image sensors associated with the plurality of linear polarizers of the same matrix block are converted into light output values in which polarization-dependent deviations are compensated by spatially averaging the measurement signals of the plurality of image sensors within the same matrix block, and a spatially resolved image of the light output distribution of the light source is generated based on the light output values of all matrix blocks obtained in this manner.

2. The measuring system as claimed in claim 1, wherein micro lenses are arranged in the form of a matrix in front of the plurality of linear polarizers and one micro lens is associated with each linear polarizer.

3. The measuring system as claimed in claim 1, wherein the plurality of image sensors are in the form of CMOS sensors.

4. The measuring system as claimed in claim 1, wherein a beam splitter is provided, wherein the light of the light source can be fed by means of the beam splitter to the camera and at the same time to a spectral measuring device.

5. The measuring system as claimed in claim 4, wherein the spectral measuring device is a spectroradiometer.

6. The measuring system as claimed in claim 1, wherein an optical edge filter is provided which can be pivoted or moved into the beam path between the light source and the camera.

7. The measuring system as claimed in claim 1, wherein the microscope optics comprises at least one optical filter.

8. The measuring system as claimed in claim 1, wherein the microscope optics comprises a tube lens.

9. The measuring system as claimed in claim 1, wherein the magnification and the numerical aperture of the microscope optics are chosen so that the optical resolution is lower than the geometric resolution of the arrangement of the matrix blocks.

10. A method for measuring a light source in a polarization-independent manner using a measuring system as claimed in claim 1, in which the light source emits light which is focused on the plurality of image sensors of the camera by the microscope optics, the light passes through the plurality of linear polarizers associated with each of the plurality of image sensors, wherein the plurality of linear polarizers of the same matrix block simultaneously filter the light at their different fixed transmission directions, and the light is captured by the plurality of image sensors, wherein each image sensor of the plurality of image sensors converts the light that is incident on the image sensor into a measurement signal, wherein the measurement signals of the plurality of image sensors that are associated with the plurality of linear polarizers of the same matrix block are then converted into light output measured values in which polarization-dependent deviations are compensated for, by spatially averaging the light output measurement values of the plurality of image sensors within the same matrix block, and a spatially resolved image of the distribution of the light output of the light source is produced from the light output measured values of all the matrix blocks.

11. The method as claimed in claim 10, wherein the measured light source is an arrangement of VCSEL elements in the form of a matrix.

12. The method as claimed in claim 10, wherein the measurement is performed with a spatial resolution of less than 1 μm.

13. The method as claimed in claim 10, wherein the light source emits light with a wavelength greater than 800 nm.

14. The method as claimed in claim 10, wherein the conversion of the measurement signals of the plurality of image sensors that are associated with the plurality of linear polarizers of the same matrix block into absolute light output measured values is carried out on the basis of a calibration performed beforehand.

15. The measuring system of claim 1, wherein the conversion of the measurement signals of the image sensors associated with the linear polarizers of the same matrix block into absolute radiometric light output measured values is performed using a polarization-dependent correction factor, the polarization-dependent correction factor being determined from two-dimensional polarization information contained in the respective matrix block using a value obtained from a calibration performed beforehand.

16. The method of claim 10, wherein converting the measurement signals of the image sensors associated with the linear polarizers of the same matrix block into absolute radiometric light output measured values comprises applying a polarization-dependent correction factor, the polarization-dependent correction factor being determined from two-dimensional polarization information contained in the respective matrix block using a value obtained from a calibration performed beforehand.

* * * * *